(No Model.)
G. D. BURTON.
STOCK CAR.
No. 348,886. Patented Sept. 7, 1886.
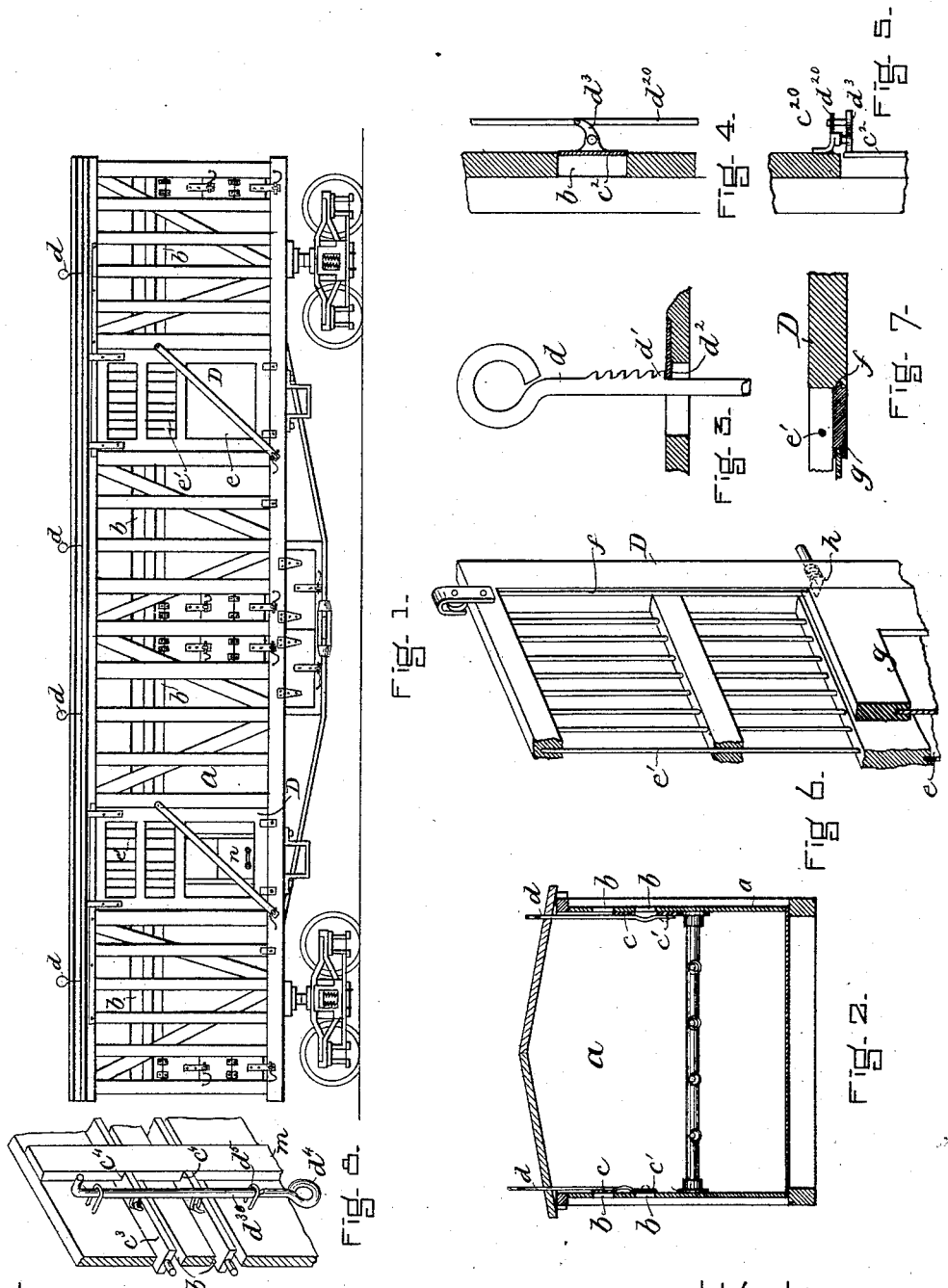
WITNESSES.
E. F. Perkins
Jos. P. Livermore
INVENTOR.
Geo. D. Burton

UNITED STATES PATENT OFFICE.

GEORGE D. BURTON, OF NEW IPSWICH, NEW HAMPSHIRE.

STOCK-CAR.

SPECIFICATION forming part of Letters Patent No. 348,886, dated September 7, 1886.

Application filed March 22, 1886. Serial No. 196,175. (No model.)

*To all whom it may concern:*

Be it known that I, GEORGE D. BURTON, of New Ipswich, county of Hillsborough, State of New Hampshire, have invented an Improvement in Stock-Cars, of which the following description, in connection with the accompanying drawings, is a specification, like letters on the drawings representing like parts.

The object of my invention relating to stock-cars is to provide means for controlling the amount of air admitted to the car, so that the animals may be kept warmer in cold weather than in cars of usual construction. Stock-cars as now made are usually provided with openings in the sides to admit air to the animals, these openings being usually made by omitting one or two strips of the boarding at the sides of the car, and also by providing the doors with openings, the said doors being made of framing traversed by iron bars. The openings have to be made sufficiently large to admit air enough for the animals in warm, still weather, and in cold weather, when the wind is high, they admit much more air than is required for proper ventilation, and make the interior of the car very cold. In order to remove this objection and enable the amount of air admitted to the car to be regulated in accordance with the requirements, the car is, in accordance with the present invention, provided with movable covers for the openings, and means to operate them, so that the openings may be partially or wholly covered or closed, when desired.

Figure 1 is a side elevation of a car provided with means for controlling the admission of air in accordance with this invention; Fig. 2, a transverse vertical section thereof; Fig. 3, a detail showing the means for operating the covers to the openings in the sides of the car; Figs. 4 and 5, details showing a modification of the covers and means for operating them; Fig. 6, a partial perspective view of the car-door; Fig. 7, a sectional detail thereof; and Fig. 8, a modification shown in perspective.

The car-body $a$ may be of any suitable or usual construction, and is provided with the usual openings, $b$, along its sides, (shown as narrow slits,) extending lengthwise of the car, and formed by omitting a portion of the boards forming the sheathing at the sides.

In order to control the admission of air through the openings $b$, or to fully close the said openings, if desired, in cold windy weather, the car is, in accordance with this invention, provided with movable covers $c$ $c'$ for the said openings, shown in Fig. 2 as long thin strips of a width equal to that of the openings $b$, and arranged to slide vertically on the sides of the car, so that they may partially or wholly cover the said openings, as shown on the left-hand side of Fig. 2, or leave the said openings uncovered, in order to admit the air, as shown on the right-hand side of Fig. 2.

The movable covers $c$ $c'$ may be operated by suitable handles, $d$, best shown in Fig. 3, extending through the top of the car, and provided with means to hold them at any desired height, in order to wholly or partially cover the openings in the car.

As shown in Fig. 3, the shank portion of the handle $d$ is provided with a series of shoulders, $d'$, any one of which may be placed in engagement with the plate $d^2$ at the side of the opening in the top of the car through which the said shank works, thus enabling it and the connected covers $c$ $c'$ to be retained at any desired elevation.

As shown in Figs. 4 and 5, the covers $c^2$ are pivoted in arms or brackets $c^{20}$, connected with the side walls of the car, near the ends of the openings $b$, and the said covers are operated by cranks $d^3$, connected with the shank $d^{20}$ of the hankle $d$ at the top of the car, by which the covers $c^2$ may be turned to and retained at any desired angle, to admit more or less air through the openings $b$, or to wholly close the said openings, as shown in Fig. 4.

As shown in Fig. 8, the covers $c^3$ are pivoted in line with the sheathing of the side of the car, and are provided with notches $c^4$ to receive the upright framing, $m$, of the car, and the said covers are operated by a rod, $d^{30}$, having its handle $d^4$ in position to be operated from the interior of the car, the said rod being provided with a shoulder, $d^5$, by which it is supported in position to retain the covers $c^3$ at right angles to the openings in condition to admit air.

The doors D of the car are made, as best shown in Fig. 6, of an open frame, the lower portion of which is closed by a suitable panel, $e$, and the upper portion of which is left open and provided with bars $e'$. The uprights of the doors are, as shown in this instance, provided with grooves $f$, which receive a vertically-moving panel or cover, $g$, that may be raised to partially or wholly cover the opening in the upper part of the door. The cover $g$, when raised, may be engaged and supported by a device, $h$, shown as a sliding latch or dog.

In order to enable the car to be cleaned, or refuse matter to be thrown out without opening the doors D, the said doors may be provided with a small opening in the lower portion, having a sliding cover, $n$, (shown in Fig. 1,) which may be opened, when desired, without opening the doors D, thus enabling refuse matter to be thrown out without admitting a large amount of cold air, and also without affording an opportunity for small animals—such, for instance, as calves—to escape.

By means of the herein-described covers, the person in charge of the stock-car is enabled to close the openings in cold or windy weather, when sufficient air will find its way through the crevices to keep the car properly ventilated, and when the wind is in the proper direction the openings at one side of the car may be closed while those at the other side are retained open, and the animals may thus be supplied with the necessary amount of fresh air without exposing them to severe cold.

I claim—

1. A stock-car provided with openings to admit air, in combination with movable covers pivoted within the openings and provided with a rod for operating the covers, substantially as described.

2. A stock-car provided with openings to admit air, in combination with covers pivoted within the openings and provided with a rod for operating the covers, said rod sliding in guides, and having a stop which engages with the guide, substantially as and for the purposes specified.

In testimony whereof I have signed my name to this specification in the presence of two subscribing witnesses.

GEO. D. BURTON.

Witnesses:
 E. F. PERKINS,
 CHAS. F. ADAMS.